United States Patent
Schultz et al.

(10) Patent No.: US 11,023,911 B2
(45) Date of Patent: *Jun. 1, 2021

(54) COMPARATIVE ITEM PRICE TESTING

(71) Applicant: Kabam, Inc., San Francisco, CA (US)

(72) Inventors: Stephanie Schultz, San Francisco, CA (US); Kellen Christopher Smalley, Pleasanton, CA (US); Michael C. Caldarone, Palo Alto, CA (US)

(73) Assignee: KABAM, INC., San Francisco, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/299,488

(22) Filed: Mar. 12, 2019

(65) Prior Publication Data

US 2019/0205909 A1    Jul. 4, 2019

Related U.S. Application Data

(63) Continuation of application No. 14/065,341, filed on Oct. 28, 2013, now Pat. No. 10,282,739.

(51) Int. Cl.
*G06Q 30/02*    (2012.01)

(52) U.S. Cl.
CPC ..... *G06Q 30/0206* (2013.01); *G06Q 30/0209* (2013.01)

(58) Field of Classification Search
None
See application file for complete search history.

(56) References Cited

U.S. PATENT DOCUMENTS

| 5,816,918 | A | 10/1998 | Kelly |
| 5,933,813 | A | 8/1999 | Teicher |

(Continued)

FOREIGN PATENT DOCUMENTS

| KR | 1020130137431 | 12/2013 |
| WO | 2002026333 | 1/2002 |

(Continued)

OTHER PUBLICATIONS

Li, S.G., "the enhanced quality function deployment for developing virtual items in massive multiplayer online role playing games" p. 6 https://reader.elsevier.com/reader/sd/pii/S0360835207000964?token=4099F14AC3B9A0371C6836486216C81B082E2A5C89603632F86E4E2D749BC938644FA16AE503D43F06443FED463B7831 (Year: 2006).*

(Continued)

*Primary Examiner* — Michael W Schmucker
*Assistant Examiner* — Alfred H Tsui
(74) *Attorney, Agent, or Firm* — Esplin & Associates, PC

(57) ABSTRACT

An online gaming system for valuing new virtual items introduced into an online game. The system may comprise one or more processors configured to execute computer program modules. The system may include a virtual shop module configured to present offers to sell instances of probability item bundles including a first offer to sell instances of a first probability item bundle that includes a first primary item and a first set of secondary items for a price, and a second offer to sell instances of a second probability item bundle that includes a second primary item and a second set of secondary items for the same price. The system may include a price determination module configured to determine a value for the second primary virtual item based on comparative sales of the first probability item bundle and the second probability item bundle.

10 Claims, 3 Drawing Sheets

(56) References Cited

U.S. PATENT DOCUMENTS

| | | | |
|---|---|---|---|
| 5,964,660 A | 10/1999 | James | |
| 6,190,225 B1 | 2/2001 | Coleman | |
| 6,561,904 B2 | 5/2003 | Locke | |
| 6,745,236 B1 | 6/2004 | Hawkins | |
| 6,850,900 B1 | 2/2005 | Hare | |
| 6,928,474 B2 | 8/2005 | Venkatesan | |
| 7,076,453 B2 | 7/2006 | Jammes | |
| 7,381,133 B2 | 6/2008 | Thomas | |
| 7,533,336 B2 | 5/2009 | Jaffe | |
| 7,644,863 B2 * | 1/2010 | Chen | G06Q 10/08 235/385 |
| 7,660,740 B2 | 2/2010 | Boone | |
| 7,682,239 B2 | 3/2010 | Friedman | |
| 7,785,188 B2 | 8/2010 | Cannon | |
| 7,813,821 B1 | 10/2010 | Howell | |
| 7,819,749 B1 | 10/2010 | Fish | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,066,571 B2 | 11/2011 | Koster | |
| 8,117,063 B2 * | 2/2012 | Xie | G06Q 30/02 705/7.35 |
| 8,147,340 B2 | 4/2012 | BrunetdeCourssou | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 | 8/2012 | Hoffman | |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 | 9/2012 | Kelly | |
| 8,282,491 B2 | 10/2012 | Auterio | |
| 8,287,367 B2 | 10/2012 | Hall | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,584 B2 | 11/2012 | Aoki | |
| 8,317,601 B1 | 11/2012 | Luciano | |
| 8,323,110 B2 | 12/2012 | Shibamiya | |
| 8,328,642 B2 | 12/2012 | Mosites | |
| 8,332,260 B1 | 12/2012 | Mysen | |
| 8,332,544 B1 | 12/2012 | Rails | |
| 8,348,716 B2 | 1/2013 | Ganz | |
| 8,348,762 B2 | 1/2013 | Willis | |
| 8,348,767 B2 | 1/2013 | Mahajan | |
| 8,348,768 B2 | 1/2013 | Auterio | |
| 8,360,858 B2 | 1/2013 | LaRocca | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann | |
| 8,371,925 B2 | 2/2013 | Bonney | |
| 8,376,826 B2 | 2/2013 | Katz | |
| 8,382,572 B2 | 2/2013 | Hoffman | |
| 8,388,427 B2 | 3/2013 | Yariv | |
| 8,401,913 B2 | 3/2013 | Alivandi | |
| 8,408,989 B2 | 4/2013 | Bennett | |
| 8,439,759 B1 | 5/2013 | Mello | |
| 8,475,262 B2 | 7/2013 | Wolf | |
| 8,506,394 B2 | 8/2013 | Kelly | |
| 8,512,150 B2 | 8/2013 | Herrmann | |
| 8,583,266 B2 | 11/2013 | Herbrich | |
| 8,636,591 B1 | 1/2014 | Hawk | |
| 8,777,754 B1 | 7/2014 | Santini | |
| 8,784,214 B2 | 7/2014 | Parks | |
| 8,790,185 B1 | 7/2014 | Calderone | |
| 8,831,758 B1 | 9/2014 | Chu | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0190960 A1 | 10/2003 | Jokipii | |
| 2004/0002387 A1 | 1/2004 | Grady | |
| 2004/0068451 A1 | 4/2004 | Lenk | |
| 2004/0215524 A1 | 10/2004 | Parkyn | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |
| 2006/0063587 A1 | 3/2006 | Manzo | |
| 2006/0116196 A1 | 6/2006 | Vancura | |
| 2006/0155597 A1 | 7/2006 | Gleason | |
| 2006/0200370 A1 | 9/2006 | Ratliff | |
| 2006/0217198 A1 | 9/2006 | Johnson | |
| 2006/0287029 A1 | 12/2006 | Yoshinobu | |
| 2006/0287102 A1 | 12/2006 | White | |
| 2007/0021213 A1 | 1/2007 | Foe | |
| 2007/0077988 A1 | 4/2007 | Friedman | |
| 2007/0111770 A1 | 5/2007 | Van Luchene | |
| 2007/0129139 A1 | 6/2007 | Nguyen | |
| 2007/0129147 A1 | 6/2007 | Gagner | |
| 2007/0191101 A1 | 8/2007 | Coliz | |
| 2007/0191102 A1 | 8/2007 | Coliz | |
| 2007/0213116 A1 | 9/2007 | Crawford | |
| 2008/0032787 A1 | 2/2008 | Low | |
| 2008/0058092 A1 | 3/2008 | Schwartz | |
| 2008/0113706 A1 | 5/2008 | OHalloran | |
| 2008/0124353 A1 | 5/2008 | Brodeur | |
| 2008/0154798 A1 | 6/2008 | Valz | |
| 2008/0171599 A1 | 7/2008 | Salo | |
| 2008/0200260 A1 | 8/2008 | Deng | |
| 2008/0207306 A1 | 8/2008 | Higbie | |
| 2008/0227525 A1 | 9/2008 | Kelly | |
| 2008/0234043 A1 | 9/2008 | McCaskey | |
| 2008/0275786 A1 | 11/2008 | Gluck | |
| 2008/0300045 A1 | 12/2008 | Ratcliff | |
| 2009/0011812 A1 | 1/2009 | Katz | |
| 2009/0017886 A1 | 1/2009 | McGucken | |
| 2009/0048918 A1 | 2/2009 | Dawson | |
| 2009/0061982 A1 | 3/2009 | Brito | |
| 2009/0124353 A1 | 5/2009 | Collette | |
| 2009/0204907 A1 | 8/2009 | Finn | |
| 2009/0210301 A1 | 8/2009 | Porter | |
| 2009/0234710 A1 | 9/2009 | Belgaied Hassine | |
| 2009/0315893 A1 | 12/2009 | Smith | |
| 2010/0022307 A1 | 1/2010 | Steuer | |
| 2010/0035689 A1 | 2/2010 | Altshuler | |
| 2010/0041472 A1 | 2/2010 | Gagner | |
| 2010/0050088 A1 | 2/2010 | Neustaedter | |
| 2010/0070056 A1 | 3/2010 | Coronel | |
| 2010/0094841 A1 | 4/2010 | Bardwil | |
| 2010/0099471 A1 | 4/2010 | Feeney | |
| 2010/0107214 A1 | 4/2010 | Ganz | |
| 2010/0113162 A1 | 5/2010 | Vemuri | |
| 2010/0174593 A1 | 7/2010 | Cao | |
| 2010/0198653 A1 | 8/2010 | Bromenshenkel | |

(56) References Cited

U.S. PATENT DOCUMENTS

| | | |
|---|---|---|
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1* | 9/2010 | Eglen ............... G06Q 30/0633 705/4 |
| 2010/0241492 A1 | 9/2010 | Eglen |
| 2010/0306015 A1 | 12/2010 | Kingston |
| 2011/0065511 A1 | 3/2011 | Mahan |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1* | 11/2011 | Borst ............... G06Q 30/0641 705/27.1 |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | van Os |
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | Larocca |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0290147 A1 | 10/2013 | Chandra |
| 2013/0303276 A1 | 11/2013 | Weston |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0039979 A1* | 2/2014 | Zhang ............... G06Q 30/0202 705/7.31 |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0128137 A1 | 5/2014 | Balise |
| 2014/0157314 A1 | 6/2014 | Roberts |
| 2014/0243072 A1 | 8/2014 | Santini |
| 2014/0274359 A1 | 9/2014 | Helava |
| 2014/0295958 A1 | 10/2014 | Shono |
| 2014/0304060 A1* | 10/2014 | Bous ............... G06Q 30/0207 705/14.39 |
| 2014/0337259 A1 | 11/2014 | Lamb |
| 2015/0019349 A1 | 1/2015 | Milley |
| 2015/0031440 A1 | 1/2015 | Desanti |
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2013013281 | 1/2013 |
| WO | 2013059639 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

'Quest item—WoWWiki—Your guide to the World of Warcraft', printed from http://www.wowwiki.com/Quest_Item, Retrieved on Apr. 16, 2014, 1 page.

"Behavioural Analytics & Campaigning", http://lotaris.com/behavioural._analytics_and._Campaigning.htm, screenshot access date May 24, 2012 2:21 PM, 1 page.

(56) References Cited

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, Links are to used articles, 28 pages.

"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

"Rest—WoWWiki—Your guide to the World of Warcraft", printed from http://www.wowwiki.com/Rest, May 19, 2014, 2 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.

City Coins. CityVille Wikia. Online. Accessed via the Internet. Accessed Aug. 9, 2014. <URL: http://cityville.wikia.com/wiki/City_Coins>, 2 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Dreamslayer's Enchanting and Upgrading Guide—With Pictures:D and Explanations, URL: forums.elswordonline.com/Topic5673.aspx [Retrieved Feb. 21, 2013], 8 pages.

Elsword—Wikipedia, the free encyclopedia, URL: en.wikipedia.org/wiki/Elsword [Retrieved Feb. 21, 2013], 6 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Gem System—Street Fighter X Tekken, http://www.streetfighter.com/us/sfxtk/features/gem-system, printed Nov. 6, 2012, 6 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

MapleStory—Guides—Equipment Upgrading 101: Enhancements, URL: maplestory.nexon.net/guides/game-play/systems/OOFlk; [Retrieved Jun. 24, 2013] 3 pages.

MapleStory—Guides—Equipment Upgrading 101: Potentials, URL: maplestory.nexon.net/guides/game-play/systems/OOFIj/ [Retrieved Jun. 24, 2013], 5 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

New Feature: Tiered Tournaments and Tournament Updates, printed from http://community.kabam.com/forums/showthread.php?171349-New-Feat on Feb. 11, 2014, 2 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Path of Exile, Internet posting: http://web.archive.org/web/20120606004658/http://www.pathofexile.com/forum/view-thread/12056, Nov. 16, 2011, 52 pages.

Profession—WoWWiki—Your guide to the World of Warcraft, URL: http://www.wowwiki.com/Profession, printed Nov. 6, 2012, 8 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, Published on Mar. 14, 2009, 1 page.

Super Mario Bros. 3, StrategyWiki, the video game walkthrough and strategy guide, http://strategywiki.org/wiki/Super_Mario_Bros._3, Oct. 2, 2012, 4 pages.

TFF Challenge—UC Davis, http://tffchallenge.com/team/uc-davis/, printed Jan. 15, 2014, 12 pages.

(56) References Cited

OTHER PUBLICATIONS

TFWiki "teamfortress wiki" available Nov. 5, 2011 retrieved from https://web.archive.org/web/20111105044256/http://wiki.teamfortress.com/wiki/Loadout, 4 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.

\* cited by examiner

COMPARATIVE ITEM PRICE TESTING

FIELD OF THE DISCLOSURE

This disclosure relates to valuing new virtual content distributed to users in an online game.

BACKGROUND

Users may access virtual spaces via client computing platforms. A virtual space may include, for example, an online game. A virtual space may include virtual content. Virtual content may include one or more of a virtual item, a virtual good, a character, an offer, a notification, an aspect of the virtual space (e.g., topography, topographical elements, upgrades, display skins, etc.), and/or other content. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Virtual items and/or virtual goods may be content which is usable within the virtual space and/or an online game that takes place in the virtual space.

User engagement with the virtual space is often facilitated through user interaction with the virtual content which is distributed to the users within the virtual space through various distribution mechanisms. For example virtual content may be offered for sale to users through a virtual shop and/or shop interface of the virtual space. Virtual content may be set to a particular sales price based, at least in part, on the value of the content. The value of the content may change depending on, for example, user demand for the content. Often, new virtual content (e.g., a new virtual item) is created and distributed to the users in the virtual space. However, a difficulty in valuing new content may arise at least due to the demand of the new content being unknown. If a sales price is initially set to high, the content may not sell. If a sales price is set to low, the potential revenue generation for the new content may be lost.

SUMMARY

One aspect of the disclosure relates to a system for valuing new virtual items introduced into an online game. The system may comprise one or more processors configured to execute computer program modules. The computer program modules may comprise one or more of a virtual shop module, a distribution probability module, a bundle activation module, a sale monitoring module, a value determination module, and/or other modules.

The virtual shop module may be configured to present offers to sell instances of virtual items usable in the online game to users in a shop interface. The offers may include offers to sell instances of probability item bundles. The probability item bundles may be associated with sets of potential items that are usable in the online game. The offers may include a first offer to sell instances of a first probability item bundle for a price and a second offer to sell instances of a second probability item bundle for the same price. The first probability item bundle may be associated with a first set of potential items that includes a first primary item and a first set of secondary items. The second probability item bundle may be associated with a second set of potential items that includes a second primary item and a second set of secondary items. The first primary item may have a known value (e.g., is a virtual item previously used within the online game) and the second primary item having an unknown value (e.g., is a new virtual item). The probability item bundles may be sold at a price or prices that reflect the different virtual content that may be distributed from the probability item bundle and/or distribution probabilities associated with the different virtual content. This may facilitate market research on the value of the new content with respect to the existing content without revealing a true sale price of the new content to users.

The distribution probability module may be configured to obtain distribution probabilities for the individual potential items in the sets of potential items associated with the sold instances of the probability item bundles. The distribution probability module may be configured such that for sold instances of the first probability item bundle and sold instances of the second probability item bundle the first primary item and the second the second primary item have the same distribution probability.

The bundle activation module may be configured to distribute potential items to the users that activate instances of the probability item bundles in accordance with the distribution probabilities.

The sale monitoring module may be configured to monitor sales of the first probability item bundle and sales of the second probability item bundle. Sales may be monitored in terms of total sales volume over a given time period, total revenue generated over a given time period, and/or other sales measure.

The value determination module may be configured to determine a value for the second primary virtual item based on comparative sales (e.g., sales volume, total revenue generated, and/or other sales comparison) of the first probability item bundle and the second probability item bundle.

Another aspect of the disclosure relates to a method of valuing new virtual items introduced into an online game. The method may be implemented in a computer system including one or more physical processors and storage media storing machine-readable instructions. The method may comprise the operations of: presenting offers to sell instances of virtual items usable in the online game to users in a shop interface, including offers to sell instances of probability item bundles, the probability item bundles being associated with sets of potential items that are usable in the online game, the offers including a first offer to sell instances of a first probability item bundle for a price and a second offer to sell instances of a second probability item bundle for the same price, the first probability item bundle being associated with a first set of potential items that includes a first primary item and a first set of secondary items, and the second probability item bundle being associated with a second set of potential items that includes a second primary item and a second set of secondary items, the first primary item having a known value and the second primary item having an unknown value; obtaining distribution probabilities for the individual potential items in the sets of potential items associated with the sold instances of the probability item bundles, the distribution probability module being configured such that for sold instances of the first probability item bundle and sold instances of the second probability item bundle the first primary item and the second the second primary item have the same distribution probability; distributing potential items to the users that activate instances of the probability item bundles in accordance with the distribution probabilities; monitoring sales of the first probability item bundle and sales of the second probability item bundle; determining a value for the second primary virtual item based on comparative sales of the first probability item bundle and the second probability item bundle; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
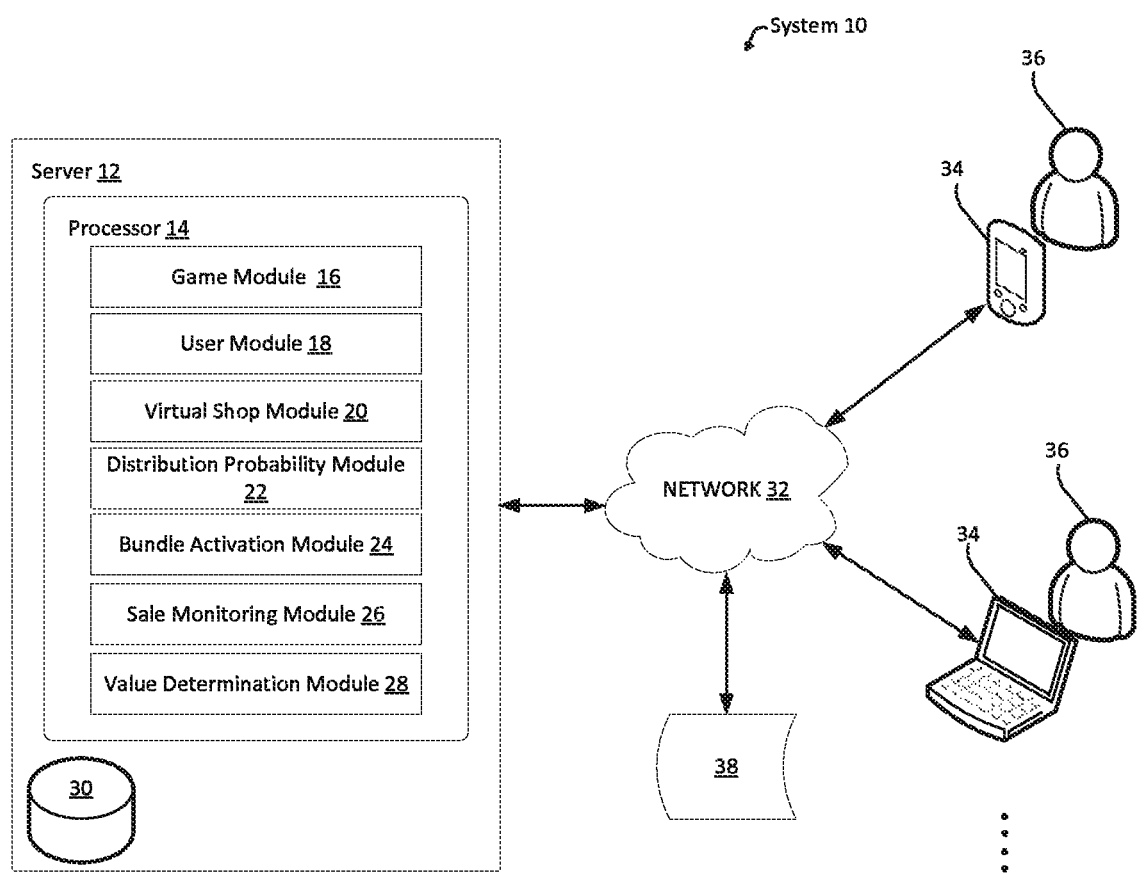
FIG. 1 illustrates a system for valuing new virtual content to be distributed to users in an online game.

FIG. 1 illustrates a system 10 for valuing new virtual content which is to be distributed in a virtual space. A virtual space may include, for example, an online game. Virtual space content may include, for example, game content. The virtual space may include a virtual shop and/or shop interface configured to facilitate the distribution of virtual content to users of the virtual space. Virtual content distribution may include offers for sale at an associated sale price. The sale price of the virtual content may be based on the value of the virtual content. New virtual content may be content which has yet to be associated with a value and/or sale price due to, for example, the unknown demand for the new content.

Virtual content may include one or more of a virtual item, a virtual good, a character, an offer, a notification, an aspect of the virtual space (e.g., topography, topographical elements, upgrades, display skins, etc.), and/or other content. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Virtual items and/or virtual goods may be usable within the virtual space and/or an online game that takes place in the virtual space. New virtual content may refer to virtual content which has previously not been offered for individual sale within the virtual space.

The value of virtual content may be considered in a variety of ways. Value may be a monetary value associated with denominations of a real and/or a virtual currency, and/or other value. The value of virtual content may fluctuate depending on the demand for the content in the virtual space. For example, user demand may depend on one or more of the effectiveness of the content in the virtual space, the ease of use, the sale price of the item, the availability of the item, and/or other considerations. Demand for a particular virtual item may decrease as more users acquire the content for use in the virtual space and/or for other reasons. In some implementations, the value of virtual content may correspond to a price at which the content is offered for individual sale. As such, following the above example, if the demand for a particular virtual item decreases, the value may decrease, and the offered sale price for the item may similarly decrease. The opposite effect may be experienced when demand for virtual content increases.

In some implementations, the sales price of virtual content may be high or lower than the value of the content. For example, content may be sold at a price lower than its value if there were to be a discounted sale. Content may be sold at a price higher than its value, for example, if the content is to be "exclusive".

However, as presented previously, a difficulty in valuing new content may arise at least due to the unknown demand of the new content. As such, the system 10 herein may be configured to value new virtual content based, at least in part, on comparative sales of the new content and existing content, wherein the existing content may have a known value and/or sale price. In some implementations, the new content and existing content are distributed (e.g., sold) to users in separate probability item bundles, described in more detail herein. A probability item bundle may be sold at a price or prices that reflect the different virtual content that may be distributed from the probability item bundle and/or distribution probabilities associated with the different virtual content. This may facilitate market research on the value of the new content with respect to the existing content without revealing a true sale price of the new content to users. For example, comparative sales may be analyzed such that the sales of the probability item bundles including the new content may be compared to the sales of the probability item bundles including the existing content. Such analysis may facilitate a determination of a relative value of the new content based on the relative sales demand for the probability item bundle containing the new content compared to the probability item bundle containing the existing content.

In FIG. 1, providing the virtual space may include hosting the virtual space over a network 32, such as the Internet. A host server may include one or more processors configured to execute one or more computer modules for implementing an instance of an online game and to facilitate the participation of one or more users in the online game. The host server may be a game server 12. The server 12 may include processor(s) 14.

The computer program modules may include one or more of a game module 16, a user module 18, a virtual shop module 20, a distribution probability module 22, a bundle activation module 24, a sale monitoring module 26, a value determination module 28, and/or other modules. The server 12 may be configured to communicate with one or more client computing platforms 34, according to client/server architecture. The client computing platforms 34 can include, for example, a cellular telephone, a smartphone, a laptop, a tablet computer, a desktop computer, a television set-top box, smart TV, a gaming console, and/or other device as described herein and/or other considerations. The users 36 may access system 10 and/or the virtual space via client computing platforms 34.

The game module 16 may be configured to implement an instance of the virtual space executed by the computer modules to determine state of the virtual space. The state may then be communicated (e.g., via streaming visual data, via object/position data, and/or other state information) from server 12 to client computing platforms 34 for presentation to users 36. The state determined and transmitted to a given client computing platform 34 may correspond to a view for a user character being controlled by a user 36 via input devices (e.g., a controller) at the given client computing platform 34. The state determined and presented to a given client computing platform 34 may correspond to a location in the virtual space (e.g., location in the game). The view described by the state for the given client computing platform 34 may correspond, for example, to the location from which the view is taken, the location the view depicts, and/or other locations, a zoom ratio, a dimensionality of objects, a point-of-view, and/or view parameters of the view. One or more of the view parameters may be selectable by the users 36.

An instance of the virtual space may comprise a simulated space that is accessible by users 36 via clients (e.g., client computing platforms 34) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer modules may be synchronous, asynchronous, and/or semi-synchronous.

The above description of the manner in which state of the virtual space is determined by game module 16 is not intended to be limiting. The game module 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 16, users 36 may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user 36 with which it is associated. The user controlled element(s) may move through and interact with the virtual space (e.g., non-user characters in the virtual space, other objects in the virtual space). The user controlled elements controlled by and/or associated with a given user 36 may be created and/or customized by the given user. The user may have an "inventory" of virtual items and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 34. The users may interact with each other through communications exchanged within the virtual space. Such communications may include one or more of textual chat, instant messages, private messages, voice communications, and/or other communications. Communications may be received and entered by the users 36 via their respective client computing platforms 34. Communications may be routed to and from the appropriate users through server 12 (e.g., through game module 16) and/or through communications which are external to the system 10 (e.g., text messaging services associated with the client computing platforms 34).

The user module 18 may be configured to access and/or manage one or more user profiles and/or user information associated with users of the system 10. The one or more user profiles and/or user information may include information stored by server 12, one or more of the client computing platforms 34, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The virtual shop module 20 may be configured to present offers to sell instances of virtual content usable in the virtual space to users in a shop interface. In some implementations, virtual shop module 20 may be configured such that virtual items are not offered for individual sale until an individual value for the virtual item is determined such that an appropriate price can be set.

The virtual shop may be a simulated environment within the virtual space which is accessible by users and presents the views of the virtual shop to the users. Users may access the virtual shop through one of a variety of ways. Users may access the virtual shop through the manipulation of one or more user characters associated with the user within the virtual space using control inputs and/or commands input by the users through client computing platforms, and/or other way of access.

Manipulation of a character may include moving the one or more user characters through the virtual space using control inputs and/or commands input by the users through client computing platforms, to move the one or more characters to the simulated environment designating the location of the virtual shop within the virtual space.

Users may use control inputs and/or commands not associated with the one or more user characters to access the virtual shop. Control inputs and/or commands may automatically present the instance of the virtual shop on the clients computing platforms (e.g., user selects a virtual shop button to automatically be taken to the virtual shop).

The instance of the virtual shop may be presented to users through a shop interface. The shop interface may be configured to present the offers to sell virtual content to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the content, and/or the one or more sets of virtual content available for purchase by the users. Users may view the virtual content (e.g., one or more virtual items and/or one or more sets of virtual items) available for purchase. Users may purchase the virtual content using virtual (or real) currency. Transactions may take place with the virtual teller, through various other actions of the user within the instance of the virtual shop, and/or other offer/transaction mechanisms.

The offers may include offers to sell instances of probability item bundles. Instances of probability item bundles may be associated with sets of potential items and/or instances of potential items that are usable in the virtual space. The sets of potential items may include at least one primary item and a set of secondary items (e.g., one or more secondary items). Primary items may be virtual items which are associated with a generally higher value and/or sale price than the items included in the set of secondary items. Instances of a probability item bundles may include the new content as the primary item. The probability item bundles may be associated with distribution probabilities for the individual potential items in the sets of potential items. The distribution probabilities may be determined, generated, and/or otherwise obtained by the distribution probability module 22 described herein.

The items included in the set of potential virtual items may be individually associated with a probability of being distributed once the probability item bundle is acquired (e.g., purchased) and/or activated by a user. The instance of a probability item bundle may be offered for sale such that a user who buys the instance of the probability item bundle has a chance to win one or more of the virtual items included in the set of potential items. In some implementations, the primary items may be associated with a lower probability of being won than the items in the set of secondary items included in the potential set of items. The quantity and type of virtual items contained within a probability item bundle, as well as the individually associated probabilities, may or may not be known or displayed to the purchaser (e.g., displayed in the virtual shop). In some implementations, a probability item bundle may be represented in the virtual space as a mystery box, virtual container, chest, package, or other item(s) within the virtual space that at least "appears" to store or contain one or more virtual items or other content.

Figure 2:
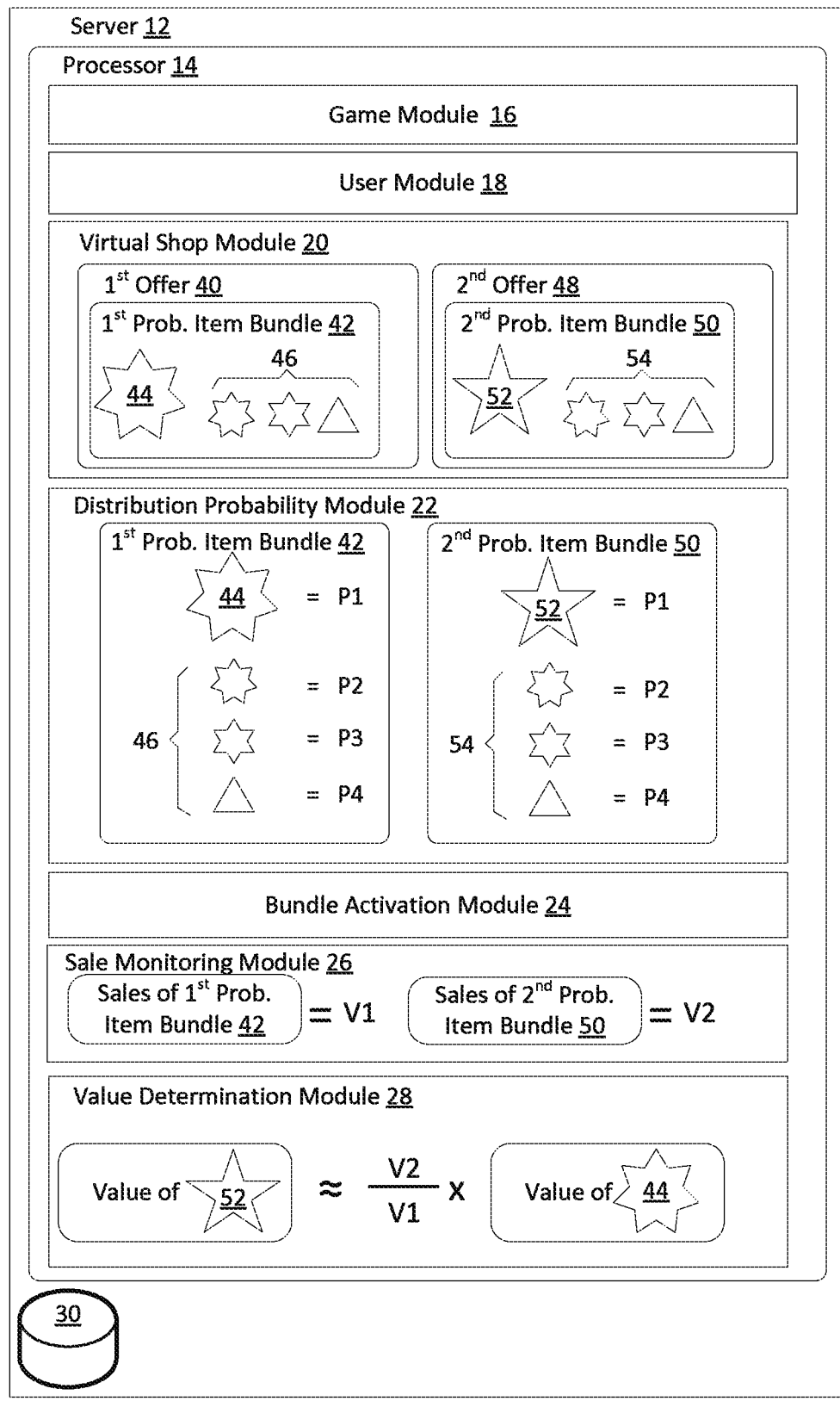
FIG. 2 illustrates a particular embodiment of the server employed in the system depicted in FIG. 1.

As an illustrative example, in FIG. 2, the offers presented by the virtual shop module 20 may include a first offer 40 and a second offer 48. The first offer 40 may include the sale of instances of a first probability item bundle 42 for a price and the second offer 48 may include the sale of instances of a second probability item bundle 50 for the same or similar price. The first probability item bundle 42 may be associated with a first set of potential items that includes a first primary item 44 and a first set of secondary items 46. The second probability item bundle 50 may be associated with a second set of potential items that includes a second primary item 52 and a second set of secondary items 54. In some implementations, the first primary item 44 may have a known individual value (and sale price) and the second primary item 52 may have an unknown value (and sale price). For example, the first primary item 44 may be an existing item within the virtual space where the demand for the content is known such that a value can be determined and a sale price set. The second primary item 52 may be a new virtual item which is to be distributed within the virtual space and has an unknown value at least because be demand for the second primary item 52 is unknown. In some implementations, the first set of secondary items 46 and the second set of secondary items 54 include the same or similar virtual items having the same or similar known values (and sale prices).

Returning to FIG. 1, the distribution probability module 22 may be configured to obtain distribution probabilities for the individual potential items in the sets of potential items associated with the sold instances of the probability item bundles. In some implementations, the probabilities are distributed such that at least one potential item will be activated (e.g., the probabilities added together equal %100). As mentioned previously, the primary items included in the sets of potential items may be associated with a relative low probability of being won compared to the probability distribution for the sets of secondary items. In some implementations, the distribution probability may be known to the users (e.g., displayed in the virtual shop). In some implementations, the distribution probability may be unknown to the users (e.g., not displayed in the virtual shop).

As an illustrative example in FIG. 2, the distribution probability module 22 may be configured such that for sold instances of the first probability item bundle 42 and sold instances of the second probability item bundle 50, the first primary item 44 and the second the second primary item 52 have the same distribution probability, e.g., P1. In some implementations, the distribution probability module 22 may be configured such that for sold instances of the first probability item bundle 42 and sold instances of the second probability item bundle 50, the first set of secondary items 46 and the second set of secondary items 54 have the same distribution probability for the items included in the sets, e.g., P2, P3, and P4, respectively. In some implementations, the probabilities are distributed such that at least one potential item will be won (e.g., P1+P2+P3+P4=%100). It is to be understood that although the first and second sets of secondary items are currently described as including three items, sets of secondary items including in the set of potential items of a probability item bundle may include more or less items.

Returning to FIG. 1, the bundle activation module 24 may be configured to distribute potential items to the users that activate instances of the probability item bundles in accordance with the distribution probabilities. Activation may be considered the time the purchase transaction is complete (e.g., the funds are successfully withdrawn from the purchasers account). Activation may be considered the time the user actually uses (e.g., opens) the probability item bundle (e.g., the probability item bundle may be purchased and then stored in a user's inventory and used at a later time). Activation may be considered in other ways.

The sale monitoring module 26 may be configured to monitor sales of the probability item bundles. Monitoring sale may include monitoring total sale volumes of the probability item bundles. Monitoring sales may include monitoring total revenue generated from the sales of the probability item bundles. Monitoring sales may include monitoring the number of repeat purchases of the probability item bundle by users. Monitoring sales may include the monitoring one or more other sales measures.

Monitoring may be performed over a given time period and/or threshold sales measure amount. For example, the sale monitoring module 26 may be configured to monitor sales for 10 minutes, 20 minutes, 30 minutes, 1 hour, 6 hours, 12 hours, 1 day, 3 days, 1 week, 1 month, and/or other time period. The sale monitoring module 26 may be configured to monitor sales until the sales of one or more of the instances of probability item bundles offered for sale reach a particular sales volume, total revenue generated, and/or other threshold measure related to the sales.

As an illustrative example, in FIG. 2, the sale monitoring module 26 may be configured to monitor the sales of the first probability item bundle 42 and sales of the second probability item bundle 50 over a given time period. In some implementations, the sale monitoring module 26 may be configured to monitor sales volumes (or other sales measure) of the first probability item bundle 42 over a given time period such that a total sales volume, e.g., V1, may be determined. In some implementations, the sale monitoring module 26 may be configured to monitor sales volume of the second probability item bundle 50 over a given time period such that a total sales volume, e.g., V2, may be determined. Monitoring of the first probability item bundle 42 and second probability item bundle 50 may be considered in other ways.

Returning to FIG. 1, the value determination module 28 may be configured to determine a value for the new content based on comparative sales of the probability item bundle including the new content and probability item bundle including existing content when sold at the same price. Comparative sales may consider one or more of total sales volume over a given time, total revenue generated over a given time, total repeat customers over a given time, and/or other considerations. Such comparison analysis may facilitate the determination of a relative value of new content based on the relative sales of the respective probability item bundles, and the known sale price of the existing item of known value. The determined relative value for the new content may then be used to set a sale price for the new content. In some implementations, the determined relative value may be set as the sale price. In some implementations, the sale price of the new content may be set higher or lower than the determined value.

As an illustrative example, in FIG. 2, the value determination module 28 may be configured to determine a value of the second primary virtual item 52 (e.g., the new content) based on comparative sales of the first probability item bundle 42 and the second probability item bundle 50. The value determination module 28 may be configured to set a sale price for purchasing the second primary item 52 directly through the shop interface based on the determined value for the second primary item 52.

In some implementations, comparative sales may include comparison of one or more of total sales volume for a given time period, total revenue generated over a given time period, total repeat purchases by individual users, and/or other sales measure related to the sales of the first probability item bundle 42 and/or the second probability item bundle 50. For example, determining a value for the second primary item 52 based on comparative sales volume (over a given time) of the first probability item bundle 42 and the second probability item bundle 50 may comprise determining a ratio of the monitored total sales volume (e.g., via sale monitoring module 26) of the second probability item bundle 50 to the first probability item bundle 42 over a time period, e.g., V2/V1. A value of the second primary item 52 may be based on the determined ratio, e.g., V2/V1. A determination of a relative value based on the ratio may comprise multiplying the known value of the first primary item by the ratio. The determined relative value may be the value of the second primary item 52. The value of the second primary item 52 may be used to set a price for purchasing the second primary item 52 directly through the shop interface. In some implementations, the price for the second primary item 52 may be the determined value of the second primary item 52. In some implementations, the price for the second primary item 52 may be higher or lower than the determined value.

Returning to FIG. 1, the server 12, client computing platforms 34, and/or external resources 38 may be operatively linked via one or more electronic communication links. For example, such electronic communication links may be established, at least in part, via a network 32 such as the Internet and/or other networks. It will be appreciated that this is not intended to be limiting, and that the scope of this disclosure includes implementations in which servers 12, client computing platforms 34, and/or external resources 38 may be operatively linked via some other communication media.

The external resources 38 may include sources of information, hosts and/or providers of virtual spaces outside of system 10, external entities participating with system 10, external entities for player-to-player communications, and/or other resources. In some implementations, some or all of the functionality attributed herein to external resources 38 may be provided by resources included in system 10.

The server 12 may include electronic storage 30, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 14, information received from server 12, information received from client computing platforms 34, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24, 26, 28. Processor 14 may be configured to execute modules 16, 18, 20, 22, 24, 26, 28 by software; hardware; firmware; some combination of software, hardware, and/or firmware; and/or other mechanisms for configuring processing capabilities on processor 14.

It should be appreciated that although modules 16, 18, 20, 22, 24, 26, 28 are illustrated in FIG. 1 as being co-located within a single processing unit, in implementations in which processor 14 includes multiple processing units, one or more of modules 16, 18, 20, 22, 24, 26, 28 may be located remotely from the other modules. The description of the functionality provided by the different modules 16, 18, 20, 22, 24, 26, 28 described above is for illustrative purposes, and is not intended to be limiting, as any of modules 16, 18, 20, 22, 24, 26, 28 may provide more or less functionality than is described. For example, one or more of modules 16, 18, 20, 22, 24, 26, 28 may be eliminated, and some or all of its functionality may be provided by other ones of modules 16, 18, 20, 22, 24, 26, and/or 28 and/or other modules. As another example, processor 14 may be configured to execute one or more additional modules that may perform some or all of the functionality attributed below to one of modules 16, 18, 20, 22, 24, 26, 28.

Figure 3:
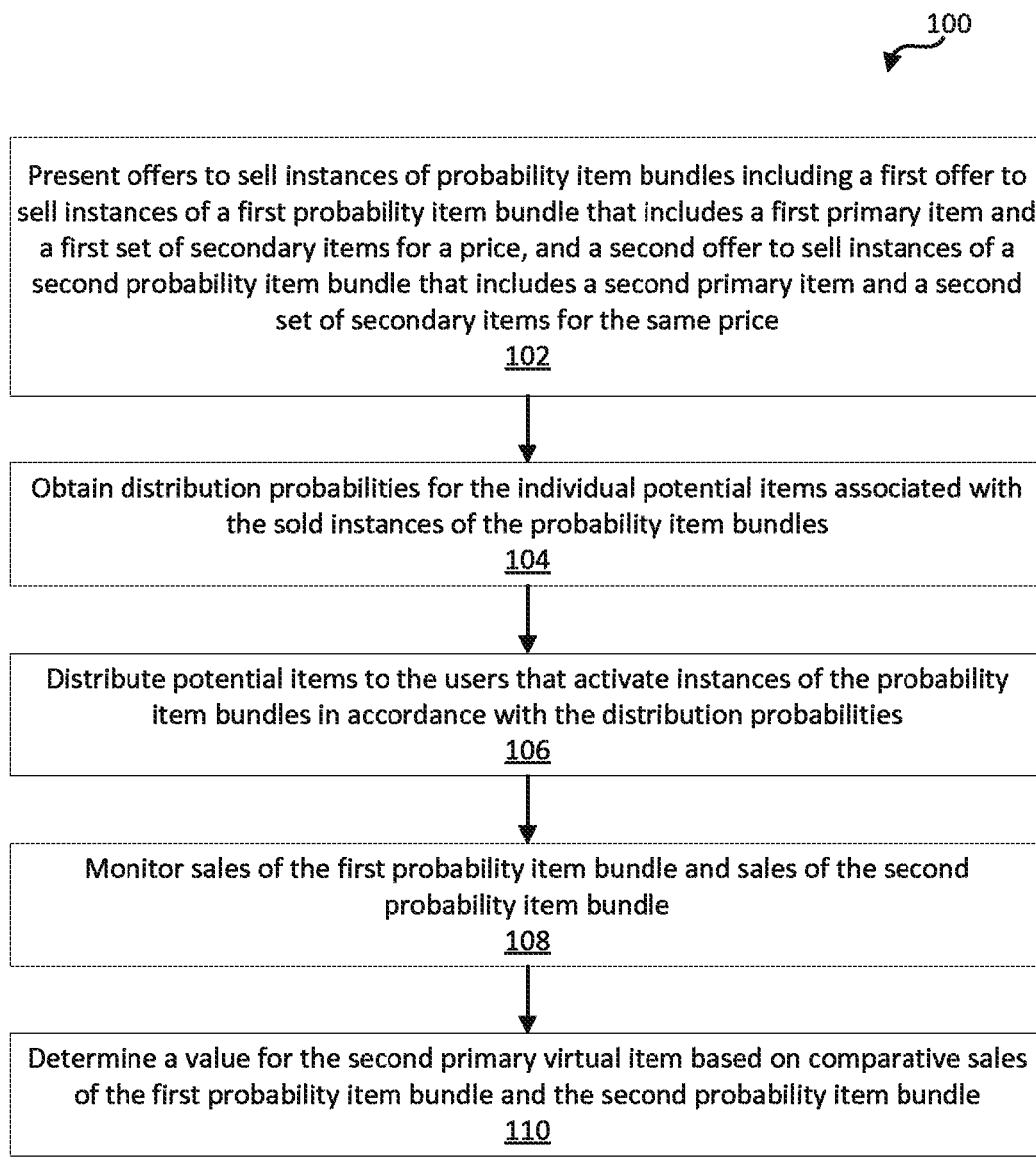
FIG. 3 illustrates a method for valuing new virtual content to be distributed to users in an online game.

FIG. 3 illustrates a method 100 of pricing new content to be distributed into an online game using comparative sales analysis techniques as described herein. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 offers to sell instances of virtual items usable in an online game may be presented to users in a shop interface. The offers may include offers to sell instances of probability item bundles. The probability item bundle may be associated with sets of potential items that are usable in the online game. The offers may include a first offer to sell instances of a first probability item bundle for a price and a second offer to sell instances of a second probability item bundle for the same price. The first probability item bundle may be associated with a first set of potential items that includes a first primary item and a first set of secondary items. The second probability item bundle may be associated with a second set of potential items that includes a second primary item and a second set of secondary items. The first primary item may have a known value and the second primary item having an unknown value (e.g., is a new item). In some implementations, operation 102 may be performed by a virtual shop module 20 the same as or similar to virtual shop module 20 (shown in FIG. 1 and described herein).

At an operation 104, distribution probabilities for the individual potential items in the sets of potential items associated with the sold instances of the probability item bundles may be obtained. The distribution probability module may be configured such that for sold instances of the first probability item bundle and sold instances of the second probability item bundle, the first primary item and the second the second primary item have the same distribution probability. In some implementations, operation 104 may be performed by a distribution probability module the same as or similar to the distribution probability module 22 (shown in FIG. 1 and described herein).

At an operation 106, the potential items may be distributed in accordance with the distribution probabilities to the users that activate instances of the probability item bundles. In some implementations, operation 106 may be performed by a bundle activation module the same as or similar to the bundle activation module 24 (shown in FIG. 1 and described herein).

At an operation 108, sales of the first probability item bundle and sales of the second probability item bundle may be monitored. Monitoring may include monitoring one or more of sales volumes, total revenue generated, and/or other measures. In some implementations, operation 108 may be performed by a sale monitoring module the same as or similar to the sale monitoring module 26 (shown in FIG. 1 and described herein).

At an operation 110, a value for the second primary virtual item may be determined based on comparative sales of the first probability item bundle and the second probability item bundle. The determined value may be used to set a sales price of the second primary item when sold directly through the shop interface. In some implementations, operation 110 may be performed by a value determination module the same or similar to the value determination module 28 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for valuing new virtual items introduced into an online game and presenting offers of the new virtual items to users of the online game, the system comprising:
one or more processors configured by machine-readable instructions to:
presenting offers to sell instances of virtual items usable in the online game to the users in a shop interface, the offers to sell instances of probability item bundles including a first offer and a second offer, the probability item bundles being associated with sets of potential items that are usable in the online game, wherein the first offer is to sell instances of a first probability item bundle for a first price and wherein the second offer is to sell instances of a second probability item bundle for a second price, the first probability item bundle being associated with a first set of potential items that includes a first primary item and a first set of secondary items, and the second probability item bundle being associated with a second set of potential items that includes a second primary item and a second set of secondary items, wherein the first primary item has a known value and the second primary item has a to-be-determined value, wherein the known value of the first primary item is a value to users that is known to a game administrator based on previous use in the online game, and the to-be-determined value of the second primary item is not known yet;
obtain distribution probabilities for individual potential items in the sets of potential items associated with sold instances of the probability item bundles, such that for sold instances of the first probability item bundle and the sold instances of the second probability item bundle the first primary item has a first distribution probability and the second primary item has a second distribution probability;
distribute the individual potential items to the users subsequent to the users activating the sold instances of the probability item bundles, wherein distribution is in accordance with the distribution probabilities;
monitor sales of the first probability item bundle and sales of the second probability item bundle; and
determine the to-be-determined value for the second primary item based on a comparison between the sales of the first probability item bundle and the sales of the second probability item bundle, wherein the determination is based on the first price and the known value.

2. The system of claim 1, wherein the one or more processors are further configured by machine-readable instructions such that for the sold instances of the first probability item bundle and the sold instances of the second probability item bundle the first set of secondary items and the second set of secondary items have the same distribution probability.

3. The system of claim 1, wherein the one or more processors are further configured by machine-readable instructions such that determining the to-be-determined value for the second primary item comprises determining a ratio of a first sales volume of the first probability item bundle to a second sales volume of the second probability item bundle over a time period.

4. The system of claim 3, wherein the one or more processors are further configured by machine-readable instructions such that determining the to-be-determined value of the second primary items comprises one or more of a multiplication and a division involving the determined ratio and the known value of the first primary item.

5. The system of claim 1, wherein the first price is equal to the second price, and wherein the first distribution probability is equal to the second distribution probability.

6. The system of claim 1, wherein the one or more processors are further configured by machine-readable instructions such that virtual items are not offered for individual sale until an individual value for the virtual item is determined.

7. A method of valuing new virtual items introduced into an online game and presenting offers of the new virtual items to users of the online game, the method being implemented in a computer system including one or more physical processors and storage media storing machine-readable instructions, the method comprising:
presenting offers to sell instances of virtual items usable in the online game to the users in a shop interface, the offers to sell instances of probability item bundles including a first offer and a second offer, the probability item bundles being associated with sets of potential items that are usable in the online game, wherein the first offer is to sell instances of a first probability item bundle for a first price and wherein the second offer is to sell instances of a second probability item bundle for a second price, the first probability item bundle being associated with a first set of potential items that includes a first primary item and a first set of secondary items, and the second probability item bundle being associated with a second set of potential items that includes a second primary item and a second set of secondary items, wherein the first primary item has a known value and the second primary item has a to-be-determined value, wherein the known value of the first primary item is a value to users that is known to a game administrator based on previous use in the online game, and the to-be-determined value of the second primary item is not known yet;
obtaining distribution probabilities for individual potential items in the sets of potential items associated with sold instances of the probability item bundles, such that for sold instances of the first probability item bundle and sold instances of the second probability item bundle the first primary item has a first distribution probability and the second primary item has a second distribution probability;
distributing the individual potential items to the users subsequent to the users activating the sold instances of the probability item bundles, wherein distribution is in accordance with the distribution probabilities;
monitoring sales of the first probability item bundle and sales of the second probability item bundle; and
determining the to-be-determined value for the second primary item based on a comparison between the sales of the first probability item bundle and the sales of the second probability item bundle, wherein determining is based on the first price and the known value.

8. The method of claim 7, wherein, for the sold instances of the first probability item bundle and the sold instances of the second probability item bundle, the first set of secondary items and the second set of secondary items have the same distribution probability.

9. The method of claim 7, wherein the first price is equal to the second price.

10. The method of claim 7, wherein the first distribution probability is equal to the second distribution probability.

* * * * *